(12) United States Patent
Actis

(10) Patent No.: US 7,743,994 B2
(45) Date of Patent: Jun. 29, 2010

(54) CONTINUOUS VIRTUAL SCAN LINE PATTERN GENERATION

(75) Inventor: Robert J. Actis, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 546 days.

(21) Appl. No.: 11/724,592

(22) Filed: Mar. 15, 2007

(65) Prior Publication Data

US 2007/0215708 A1    Sep. 20, 2007

Related U.S. Application Data

(60) Provisional application No. 60/783,082, filed on Mar. 16, 2006.

(51) Int. Cl.
*G06K 7/00* (2006.01)
*G02B 5/00* (2006.01)

(52) U.S. Cl. .............................. 235/462.32; 235/462.01

(58) Field of Classification Search ................................ 235/462.01–462.49
See application file for complete search history.

(56) References Cited

U.S. PATENT DOCUMENTS

| | | | |
|---|---|---|---|
| 5,446,271 A * | 8/1995 | Cherry et al. ............ | 235/462.1 |
| 5,635,699 A | 6/1997 | Cherry et al. | |
| 5,929,421 A | 7/1999 | Cherry et al. | |
| 6,142,376 A | 11/2000 | Cherry et al. | |
| 2004/0004128 A1 | 1/2004 | Pettinelli et al. | |
| 2005/0077358 A1 | 4/2005 | Boehm et al. | |
| 2006/0027657 A1 | 2/2006 | Ninnink et al. | |
| 2006/0081712 A1 | 4/2006 | Rudeen et al. | |
| 2006/0278708 A1 | 12/2006 | Olmstead | |
| 2006/0278712 A1 * | 12/2006 | Olmstead ............... | 235/462.32 |

* cited by examiner

*Primary Examiner*—Seung H Lee
*Assistant Examiner*—Christle I Marshall
(74) *Attorney, Agent, or Firm*—Matthew D. Thayne; Stoel Rives LLP

(57) ABSTRACT

Disclosed are embodiments of methods, systems, and apparatus for generating a continuous virtual scan line pattern from a raster line input. In certain preferred embodiments, a continuous, omni-directional virtual scan line pattern may be generated from a continuous, one-dimensional raster line input. In some embodiments, such a pattern may be generated for one or more families of shallow virtual scan lines and for one or more families of steep virtual scan lines. Some of the virtual scan line families may be configured to generate overlapping data.

33 Claims, 5 Drawing Sheets

US 7,743,994 B2

CONTINUOUS VIRTUAL SCAN LINE PATTERN GENERATION

RELATED APPLICATION DATA

This application claims the benefit under 35 U.S.C. §119(e) of U.S. Provisional Patent Application No. 60/783,082, filed Mar. 16, 2006, and titled "Continuous Virtual Scan Line Pattern Generation," hereby incorporated by reference.

COPYRIGHT NOTICE

© 2007 PSC Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The field of the present invention relates generally but not exclusively to optical code readers and, in a preferred application, it relates to systems, methods, and apparatus for generating a continuous virtual scan line pattern from a raster line input.

Imaging systems employing virtual scan lines have been proposed to provide a method for reading encoded symbols, such as barcode labels, by making efficient use of scanned input area. Some virtual scan line systems employ a raster line input. In one such system, input data may be provided by an area sensor, such as a two dimensional charge-coupled device (CCD) or complementary metal oxide semiconductor (CMOS) array or a video tube. In systems with a single line sensor (such as a single line CCD or a single line laser scanner) movement of the item by an operator or an additional transverse scanning mechanism, for example, may provide for the second axis of the raster scan. Preferably, not all of the scanned data, but only a select portion of the data corresponding to predefined virtual scan lines, is stored and processed.

The virtual scan line pattern may be defined based on the dimensions of barcode labels to be scanned, the size of the scanning area, and/or the characteristics of the scanning sensor and optics. The virtual scan lines are typically mapped onto the raster pattern, thereby allowing the pixels of the raster which fall on the virtual scan lines to be identified. As the raster scan proceeds, information regarding the intensity of the detected light is stored only for the pixels included in the virtual scan lines. The amount of data stored is therefore a fraction of the total data in the raster.

After the pixel values corresponding to the virtual scan line(s) have been stored, the edges of the bars and spaces crossed by the virtual scan line(s) may be determined by a suitable analog or digital edge detection method. Because only selected pixels from the sensor are processed, throughput is increased, which allows for the use of more sophisticated signal processing methods. The data can also be decoded by a decoder, which may use the scan line boundaries within the data stream to facilitate decoding. Further detail regarding the use of virtual scan lines can be found in U.S. Pat. No. 6,142,376, titled "Method and Apparatus for Reading Symbols on Items Moved by Conveyor," U.S. Patent Application Publication No. 2006/0278708, filed Apr. 11, 2006 and titled "System and Method for Data Reading Using Raster Scanning," and U.S. Patent Application Publication No. 2006/0081712, filed Oct. 17, 2005 and titled "System and Method of Optical Reading Employing Virtual Scan Lines." Each of the aforementioned patent documents is hereby incorporated by reference in its entirety.

Virtual scan line data has been generated in the past by using overlapping pseudo frames of virtual scan line patterns from a raster line input. This method, while effective, tends to generate and process a significant amount of overlapping data. Some such methods also generate significant numbers of short virtual scan lines, which may be less likely to contain contiguous label data.

The present inventor has therefore determined that it would be desirable to provide a continuous virtual scan line pattern from raster line input so as to improve upon these or other limitations.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which.

DETAILED DESCRIPTION OF PREFERRED EMBODIMENTS

In the following description, numerous specific details are provided for a thorough understanding of specific preferred embodiments. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed herein are embodiments of methods, systems, and apparatus for generating a continuous virtual scan line pattern from a raster line input. In certain preferred embodiments, an omni-directional virtual scan line pattern may be generated from a continuous, one-dimensional raster line input. In some embodiments, such a pattern may be generated for shallow virtual scan lines having angles of, for example, 45 degrees or less relative to the raster line, whereas steep virtual scan lines having, for example, angles greater than 45 degrees may generate some overlapping data, as described below.

Figure 1:
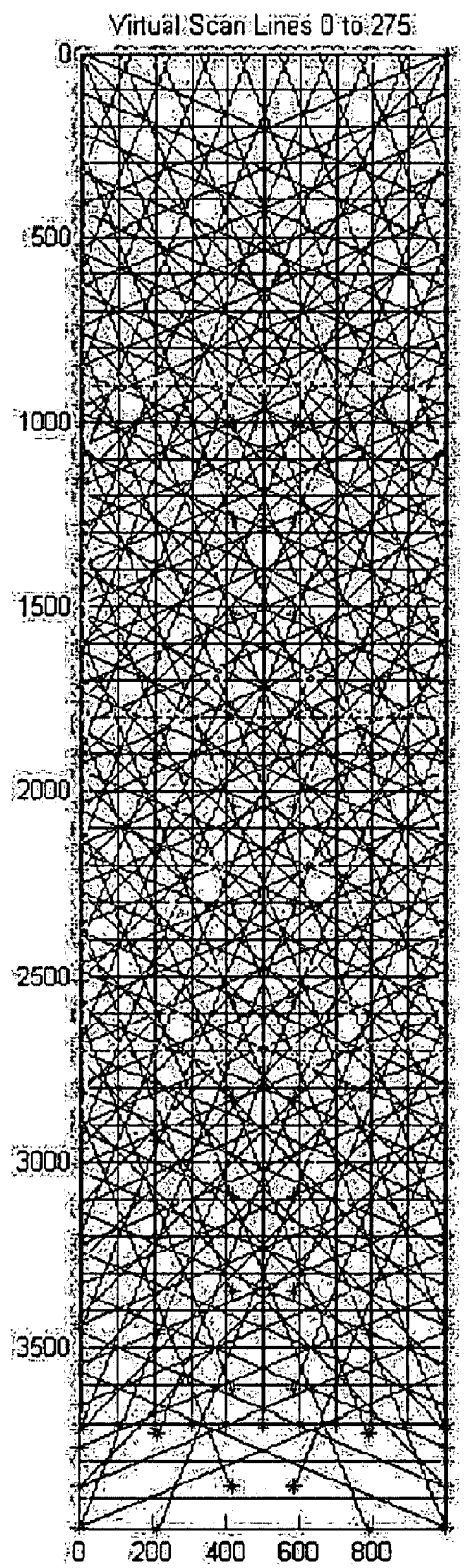
FIG. 1 is an illustrative continuous virtual scan line pattern.

FIG. 1 illustrates an illustrative continuous virtual scan line pattern in accordance with one embodiment. The "X" dimension of FIG. 1 (horizontal from the perspective of the figure) corresponds to the direction of travel of the raster line. The "Y" dimension (vertical) is formed via the travel of a product with a barcode, for example, through the raster scan line. In other words, the physical scan pattern is a single raster line with item motion providing the other dimension to form an image. It should be understood that the lines making up the pattern in FIG. 1 are composed of pixels, and are not actual, continuous lines. Only the pixels in these "virtual" scan lines will be stored.

The pattern shown in FIG. 1 includes eight "families" of virtual scan lines. A "family" of virtual scan lines as the term is used herein comprises a plurality of parallel virtual scan lines oriented at a desired angle relative to the raster line. The angles of the eight families have been selected as 0, 22.5, 45, 67.5, 90, −67.5, −45, and −22.5 degrees. The spacing between the virtual scan lines in each family has been set at approximately 100 pixels. With respect to the steep virtual scan lines (67.5, 90, and −67.5 degrees), there is a 100 pixel overlap of stored data. The pattern shown in FIG. 1 includes circles indicating the starting points of the virtual scan lines and asterisks indicating the end points of the virtual scan lines.

The pattern of FIG. 1 is generated from an algorithm that defines the pixels with data that is to be stored. These pixels are defined so as to define lines that make up the virtual scan lines. The algorithm used to generate the pattern of FIG. 1 begins by defining the eight families of virtual scan lines at the angles indicated above. The start of each virtual scan line in each family is defined at the edge of the pattern. When the first pixel of a virtual scan line in families defined by angles at 0, 22.5, 45, −45, and −22.5 degrees is located, the algorithm defines the start of the next virtual scan line in the family spaced at 100 pixels from the first located pixel (and on a future raster line). These shallow virtual scan lines repeat indefinitely throughout the pattern, rather than being part of overlapping "pseudo-frames." In this embodiment, the shallow virtual scan lines also extend between the edges of the pattern without overlapping data.

For the virtual scan lines in families defined by angles at 67.5, 90, and −67.5 degrees, when the first pixel of a line in these families is identified, the start of a new overlapping virtual scan line is defined. As can be seen in the figure, these lines extend to approximately the 1000 pixel point (on the "Y" axis) and the new overlapping virtual scan lines begin at approximately the 900 pixel point so as to create approximately 100 pixels of overlapping data in these families. These "steep" virtual scan lines are preferably not stored continuously because they are relatively long (infinitely so with regard to the 90 degree family), and because to define the lines in their entireties may cause excessive memory requirements and processing demands. In addition, as soon as the first pixel is identified in a steep virtual scan line that is the first or last pixel on the raster line, the start of a new virtual scan line in the family is defined on a future raster line at the "X" location of that pixel.

The pattern shown in FIG. 1 has equal horizontal and vertical pixel spacing. It should be appreciated, however, that faster movement of an encoded symbol through the scan line will result in a pattern that is stretched from top to bottom relative to the pattern shown in FIG. 1. Likewise, slower movement will result in a pattern that is flattened in the direction perpendicular to the raster line.

In virtual scan line pattern embodiments configured to store overlapping data for the steep lines, such as the pattern shown in FIG. 1, overlapping data from multiple virtual scan lines may be used to read a barcode label when a virtual scan line ends within the barcode label. The partial barcode label data from the first virtual scan line, combined with the overlapping barcode label data from an overlapping virtual scan line, may be used to enable the barcode to be decoded from data from the two overlapping virtual scan lines. Two overlapping barcode sequences from overlapping virtual scan lines can be assembled into a full barcode if the minimum length of each sequence, and the amount of overlap, satisfy the barcode assembly algorithm requirements. Similar to each of the other parameters, the amount of overlap may be selected as desired in accordance with the particular system, conditions, and desired outcomes. Additional information regarding combining partial label segments can be found in U.S. Pat. No. 5,929,421 titled "Method and Apparatus for Recognizing and Assembling Optical Code Information From Partially Scanned Segments," which is hereby incorporated by reference.

Of course, a wide variety of virtual scan line patterns may be generated in accordance with the general principles set forth herein. Representative virtual scan line patterns may be defined as follows. First, a series of desired virtual scan line angles are defined. As mentioned with reference to the pattern of FIG. 1, these angles will be referenced herein as measured relative to the direction of travel of the raster line input. For each such desired virtual scan line angle, a "family" of virtual scan lines may be defined. Thus, a family of scan lines at thirty degrees will include each of the virtual scan lines that extends from the line defined by the travel of the raster input at an angle of thirty degrees. In some embodiments, it may be desirable to make the definition of virtual scan line families configurable, rather than fixed or hard-coded. Each virtual scan line in the family may be separated by a fixed number of pixels as desired. Thus, the scan line families may consist of virtual scan lines spaced relatively far apart, or close together, as desired. The particular angles selected, the number of virtual scan line families, and other such parameters may vary as desired.

The virtual scan line pattern may then be initialized by, for each of the respective virtual scan line families, defining the start of each virtual scan line in the family at the start or border of the virtual scan line pattern. The virtual scan lines in each family may be started on the same line or, alternatively, the lines from each family may begin on a different raster line. When the first pixel of a virtual scan line in each family is found, the start of the next virtual scan line in the family may be defined on a future raster line. The spacing between the lines in each family may vary as desired.

The algorithm(s) used to define and generate data from a continuous virtual scan line pattern may vary considerably. In some algorithms, such as the algorithm used to generated the pattern of FIG. 1, shallow-angled virtual scan line families may be treated differently from steep-angled virtual scan line families. In accordance with one particular algorithm, "shallow" angles are considered to be those at 45 degrees or less relative to the raster line. "Steep" angles are therefore defined as those in excess of 45 degrees relative to the raster line. In accordance with these definitions, the family of virtual scan lines that is most "shallow" is that of zero degrees, or the family consisting of virtual scan lines that are selected raster lines. Likewise, the family of virtual scan lines that is most "steep" is that of 90 degrees, or the family consisting of virtual scan lines perpendicular to the raster line (or parallel to either of the lines defining the outer boundaries of the raster lines). Of course, a variety of other virtual scan line families are contemplated, and "steep" virtual scan lines that contain overlapping data may be defined at angles less than 45 degrees in some embodiments.

In this illustrative embodiment, for shallow-angled virtual scan lines, when the first pixel of a virtual scan line is found, the start of the next virtual scan line in the family may be defined. The start of the next virtual scan line in the family will be on a subsequent raster line. For steep-angled virtual scan lines, when the first pixel of a virtual scan line is found, the start of a new overlapping virtual scan line may be defined. The amount of overlap between overlapping virtual scan lines may vary as desired. Various factors are involved in determining the desired amount of overlap for a given application. For example, depending upon the algorithm used, the minimum amount of barcode label data that is required in order to recognize a piece of the barcode label may vary and this may, accordingly, lead to a greater (or lesser) amount of overlap being desired. The amount of data required may also vary with the barcode label types (UPC, Code39, etc.). In addition, item velocity will also affect the amount of overlap required to capture enough barcode label data for partial label decoding. Thus, the expected item velocity for a given application may lead to adjustments in the amount of data overlap for steep virtual scan lines.

In addition, if the first pixel of the virtual scan line is the first pixel on the raster line input, the start of an additional new virtual scan line may be defined for the family starting on a subsequent raster line to continue the family of virtual scan lines. Likewise, if the first pixel on a virtual scan line is the last pixel on the raster line, the start of a new virtual scan line may be defined to start on the last pixel of a subsequent raster line to continue the family of virtual scan lines.

The number of virtual scan lines in each family, the angle of each family, the spacing between virtual scan lines in a given family, and the amount of overlap, if any, may be configured as desired in accordance with the specifications of a particular system. In certain preferred embodiments, the number of pixels stored for each "shallow" virtual scan line will equal the number of pixels on the raster line. The number of pixels stored for each "steep" virtual scan line, on the other hand, may be artificially limited to reduce the time and processing requirements needed to store a steep virtual scan line in its entirety. In some embodiments, the number of pixels stored for each steep virtual scan line may, as with the shallow virtual scan lines, be limited to the number of pixels on the raster line.

In some implementations, a limit may be placed on the number of raster lines to complete any given steep virtual scan line. This limit may be less than the number of pixels on a raster line. For example, in one implementation having a 2,048 pixel raster line, in order to provide for a decreased read response delay, a limit of 1,024 raster lines may be placed on the steep virtual scan lines in the pattern.

For systems having limited processing capabilities, certain modifications to the aforementioned embodiments may be desired. To illustrate, starting all of the virtual scan lines on the first raster line or row may create relatively high peak-processing requirements. To reduce processing demands, each of the families of virtual scan lines may be started on a different raster line, rather than all extending from the same raster line. For example, the first family may be started on the first raster row, the second family on the second raster row, and so on. To further reduce processing demands, each virtual scan line within each family may also be started on a different raster row. Thus, for example, the family of vertical virtual scan lines may be staggered such that the first vertical virtual scan line starts on the first raster line, the second vertical virtual scan line starts on the second raster line, and so on.

In certain embodiments, additional families of virtual scan lines may be added that define steep virtual scan lines that skip raster rows. These additional families may be added in order to further facilitate the reading of slow-moving barcodes. To illustrate with further details, for barcodes that are moved past the raster scan line in an orientation perpendicular to the raster scan line, the repetition rate of the raster scan line and the speed of the barcode movement will determine the pixel resolution (spacing between pixels on the barcode). For slow moving barcodes that move perpendicular to the raster scan line, selecting pixels from every raster scan line may capture virtual scan line data with more resolution than is required. Also, since there may be a limited number of pixels in a virtual scan line, the slower a barcode moves through the raster scan line, lesser portions (length) of the barcode will generally be captured. Thus, by selecting pixels from every other (every second) raster scan line, the resolution will be reduced (by half) and the length of the barcode captured will be increased (doubled), so more of the barcode may be captured in a virtual scan line.

Some embodiments may include still other virtual scan line families that skip a greater number of raster scan lines (every 3rd, 4th, etc.) between stored pixels, which may be used for even slower moving barcodes. Similar resolution may be obtained with either a lower repetition rate raster scan line or by skipping raster scan lines. Skipping raster scan lines effectively reduces the repetition rate of the raster scan line. In one preferred embodiment, one or more virtual scan line families are included that capture pixels from every raster scan line, one or more other virtual scan line families are included that capture pixels from every second raster scan line, one or more additional families are included that capture pixels from every fourth raster scan line, and one or more families are included that capture pixels from every eighth raster scan line.

Figure 2:
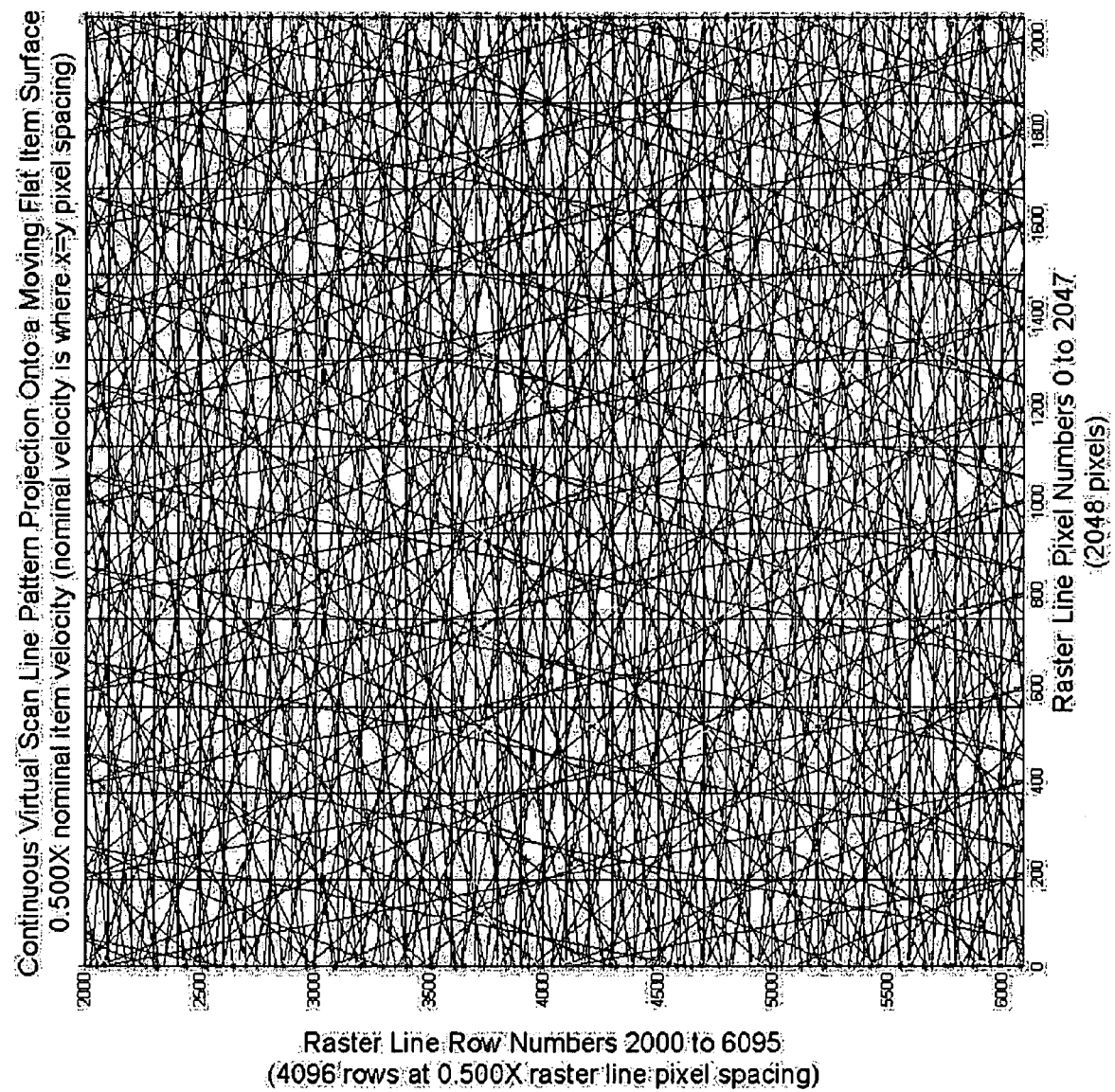
FIG. 2 is an alternative continuous virtual scan line pattern.
Figure 3:
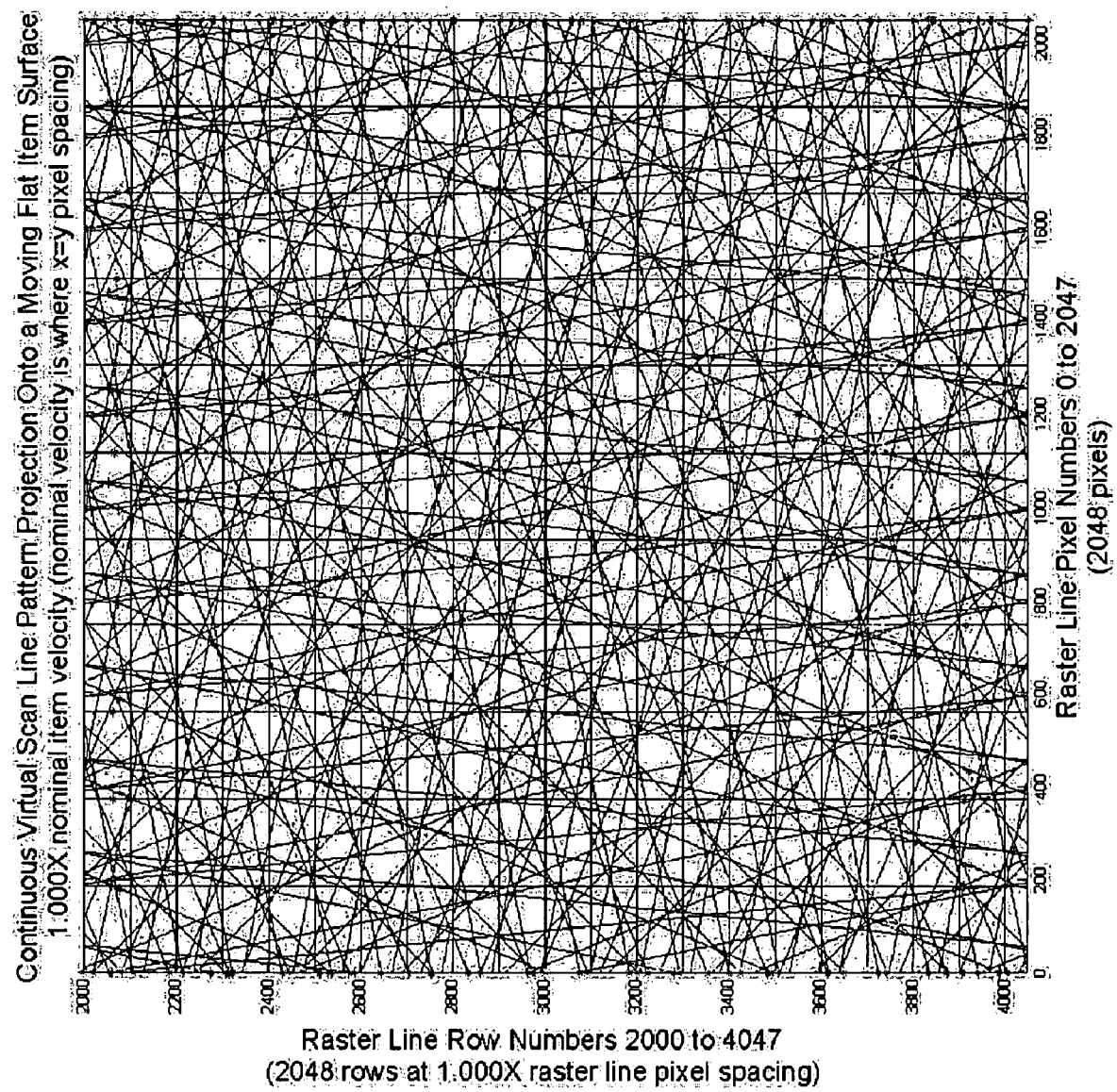
FIG. 3 depicts the continuous virtual scan line pattern of FIG. 2 with a higher item velocity.
Figure 4:
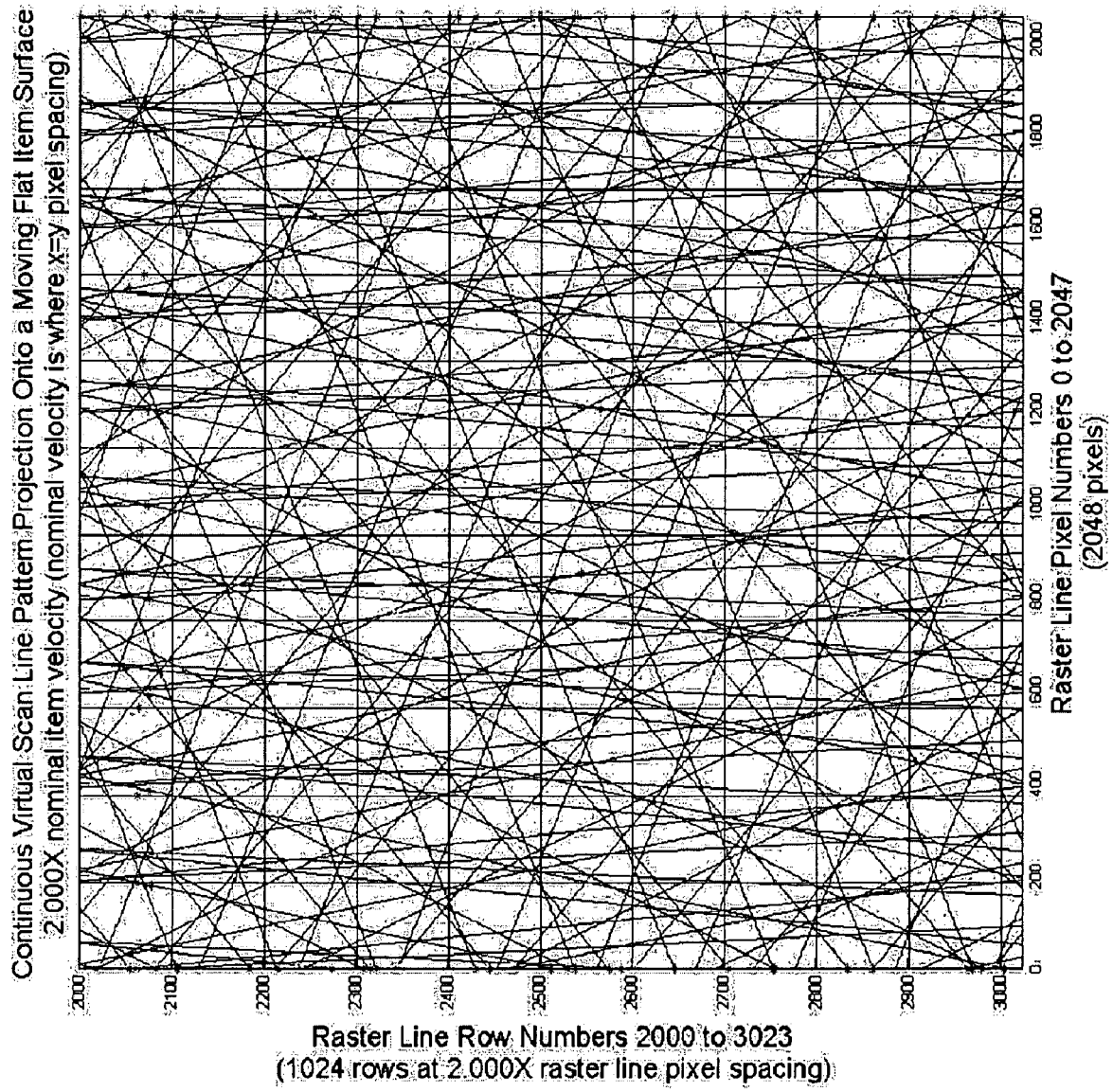
FIG. 4 depicts the continuous virtual scan line pattern of FIG. 3 with a still higher item velocity.

FIGS. 2-4 depict an alternative continuous virtual scan line pattern, each shown with a different item velocity. This pattern differs from that of FIG. 1 in several respects. First, the raster line in this pattern includes 2048 pixels, rather than 1,000. Also, the overlap has been changed from 100 pixels to 200 pixels, so as to better combine decoded barcode label pieces when the overlap falls within a barcode label. Two additional shallow virtual scan line families of 11 degrees and −11 degrees were also added, which may be desirable for providing good omni-directional coverage at higher item velocities. The 87 and −87 degree virtual scan line families that stored pixels from every eighth raster line were deleted. These lines may, however, be desirable for applications in which very slow item movement is expected. Alternatively, vertical virtual scan lines that skip raster lines may be used to ensure that slow moving items are adequately covered.

In FIG. 2, raster line row numbers 2000 to 6095 are depicted. FIG. 2 corresponds with an item velocity of about one-half of the "nominal" item velocity, which is where the raster line pixel spacing ("x" dimension) and the spacing between raster lines ("y" dimension) are equal. The raster line pixel spacing may be determined by the imaging device, optics, and the item distance from the imaging system. The spacing between raster lines may be determined by the raster line repetition rate and the item velocity.

FIG. 3 depicts the same pattern but at a higher item velocity. The item velocity in the view of FIG. 3 is approximately equal to the nominal item velocity. Because of the higher item velocity, fewer raster rows are depicted in FIG. 3. Specifically, raster line row numbers 2000 to 4047 are shown in FIG. 3. FIG. 4 again depicts the same pattern but at a still higher item velocity. The item velocity in the view of FIG. 4 is about twice the nominal item velocity, with raster line row numbers 2000 to 3023 being depicted in the figure.

Figure 5:
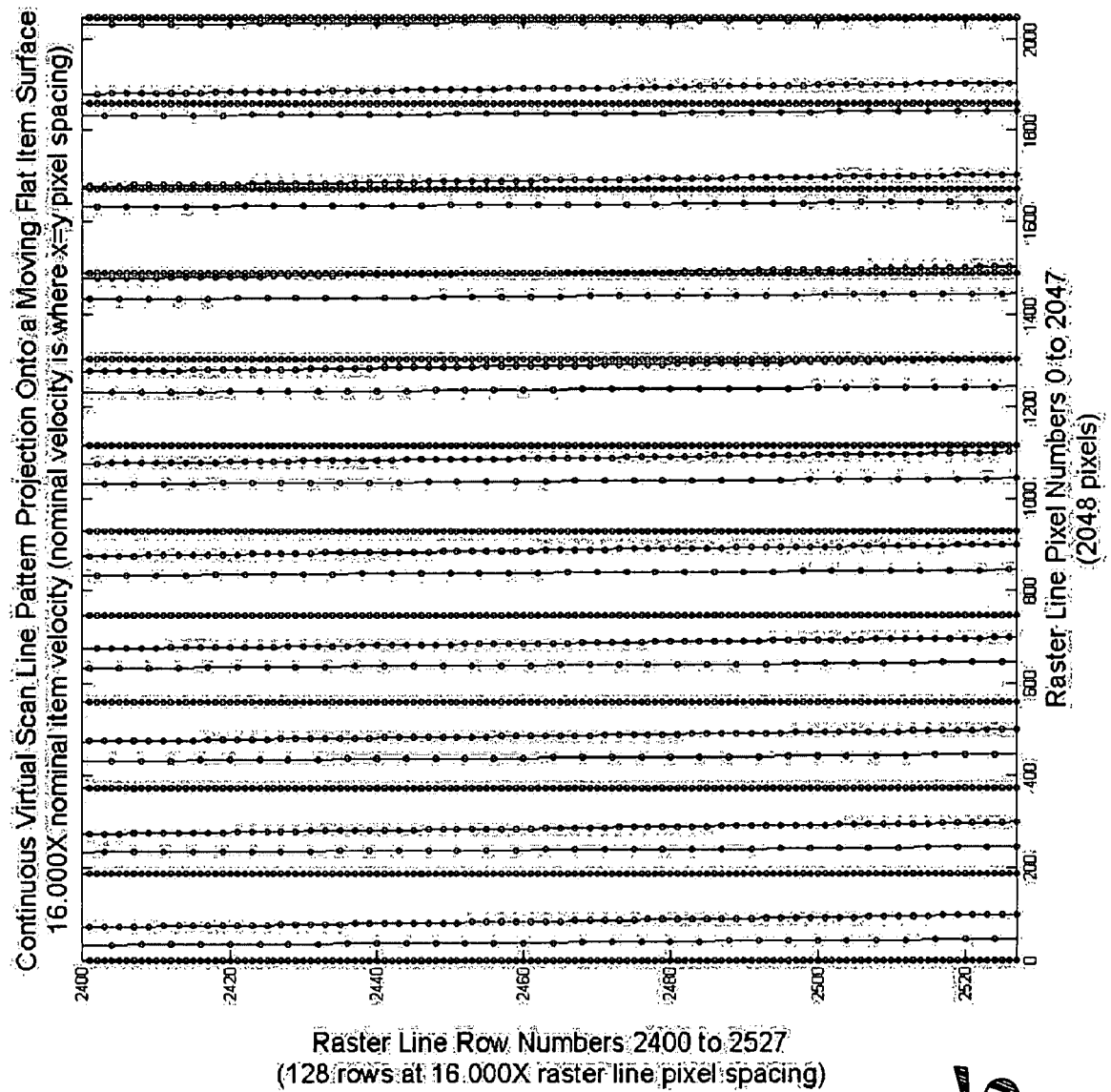
FIG. 5 depicts selected steep virtual scan line families in a virtual scan line pattern, some of which skip raster lines.

FIG. 5 depicts selected steep virtual scan line families in a virtual scan line pattern, some of which skip raster lines. As can be seen in the figure, the family of vertical virtual scan lines does not skip raster rows. Adjacent and just to the right of each vertical virtual scan line in the family is a virtual scan line in a family that skips three raster lines between each stored pixel. In other words, only the pixels in every fourth raster line are selected for storage. This family of steep virtual scan lines is defined at an angle of about 84 degrees relative to the direction of travel of the raster line input. Another family of steep virtual scan lines can be seen in FIG. 5 adjacent and just to the right of the 84-degree family. This family is defined at an angle of about 78 degrees relative to the direction of travel of the raster line input and is configured to skip (or store pixels from) every other raster line.

The 78 and 84 degree steep virtual scan line families shown in the plot of FIG. 5 are designed to have 200 pixels separation between the virtual scan lines within each family. The vertical virtual scan lines, by contrast, are separated by 186 pixels, which is why the 78 and 84 degree steep virtual scan line families appear to creep to the right across the virtual scan line pattern.

The terms and descriptions used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the claims, and their equivalents.

An example of an algorithm for constructing a Continuous Virtual Scan Line Pattern from continuous 1D raster line input data is included in the example program code provided in the Appendix.

The invention claimed is:

1. A method for storing data to form a virtual scan line pattern, comprising the steps of:
    defining at least one shallow virtual scan line family made up of a plurality of shallow virtual scan lines, wherein the shallow virtual scan lines in a given family are each defined at a distinct angle relative to the direction of travel of a raster line input, wherein the virtual scan lines within the shallow virtual scan line family are spaced apart by a fixed number of pixels, and wherein each of the virtual scan lines defined by the shallow virtual scan line family repeats indefinitely throughout the pattern;
    defining at least one steep virtual scan line family made up of a plurality of steep virtual scan lines, wherein the steep virtual scan lines in a given family are each defined at a distinct angle relative to the direction of travel of the raster line input that is greater than the angle with which the shallow virtual scan lines extend from the raster line input, and wherein at least one virtual scan line within the steep virtual scan line family comprises an overlapping portion; and
    storing data received from the raster input corresponding to pixels defined by the virtual scan line pattern.

2. The method of claim 1, wherein the at least one shallow virtual scan line family comprises a plurality of shallow virtual scan line families.

3. The method of claim 2, wherein each of the shallow virtual scan line families are started on a different raster line.

4. The method of claim 2, wherein at least one of the virtual scan line families comprises virtual scan lines that each started on a different raster line.

5. The method of claim 2, wherein each of the shallow virtual scan line families is defined at a distinct angle relative to the direction of travel of the raster line input, wherein each of the plurality of scan lines within a given shallow virtual scan line family are spaced apart by a fixed number of pixels, and wherein the virtual scan lines defined by each of the shallow virtual scan line families extend between two borders of the pattern.

6. The method of claim 5, wherein the at least one steep virtual scan line family comprises a plurality of steep virtual scan line families.

7. The method of claim 6, wherein each of the steep virtual scan line families is defined at a distinct angle relative to the direction of travel of the raster line input and wherein each virtual scan line within a given steep virtual scan line family comprises an overlapping portion.

8. The method of claim 7, wherein one of the steep virtual scan line families is made up of virtual scan lines extending from the raster line input at an angle of approximately 90 degrees.

9. The method of claim 1, wherein the steep virtual scan line family is made up of virtual scan lines extending from the raster line input at an angle greater than about 45 degrees.

10. The method of claim 9, wherein the steep virtual scan line family is made up of virtual scan lines extending from the raster line input at an angle of approximately 90 degrees.

11. The method of claim 1, wherein the virtual scan lines defined by the shallow virtual scan line family extend between two borders of the virtual scan line pattern.

12. The method of claim 1, wherein each shallow virtual scan line in the virtual scan line pattern contains a number of pixels equal to the number of pixels on the raster line.

13. The method of claim 12, wherein each steep virtual scan line in the virtual scan line pattern contains a number of pixels equal to the number of pixels on the raster line.

14. The method of claim 12, wherein each steep virtual scan line in the virtual scan line pattern contains a number of pixels fewer than the number of pixels on the raster line.

15. The method of claim 1, wherein each of the virtual scan line families are defined by an algorithm.

16. A method for reading data from encoded symbols, the method comprising the steps of:
    receiving optical data from a raster line input; and
    storing selected optical data from the raster line input, wherein the selected optical data corresponds with a virtual scan line pattern, the virtual scan line pattern defined by
        at least one shallow virtual scan line family made up of a plurality of shallow virtual scan lines, wherein the shallow virtual scan lines in each family are defined at a distinct angle relative to the direction of travel of a raster line input, wherein the shallow virtual scan lines within the shallow virtual scan line family are spaced apart by a fixed number of pixels, and wherein each of the shallow virtual scan lines defined by the shallow virtual scan line family repeats indefinitely throughout the pattern, and
        at least one steep virtual scan line family made up of a plurality of steep virtual scan lines, wherein each of the steep virtual scan lines in a given family are defined at a distinct angle relative to the direction of travel of the raster line input that is greater than the angle with which the shallow virtual scan lines extend from the raster line input and wherein at least one virtual scan line within the steep virtual scan line family comprises an overlapping portion.

17. The method of claim 16, further comprising decoding an encoded symbol from the selected optical data.

18. The method of claim 17, wherein the encoded symbol comprises a barcode symbol.

19. The method of claim 17, wherein the encoded symbol is decoded using data from two overlapping virtual scan lines.

20. The method of claim 16, wherein the at least one shallow virtual scan line family comprises a plurality of shallow virtual scan line families.

21. The method of claim 20, wherein each of the shallow virtual scan line families is defined at a distinct angle relative to the direction of travel of the raster line input, wherein each of the plurality of scan lines within a given shallow virtual scan line family are spaced apart by a fixed number of pixels, and wherein the virtual scan lines defined by each of the shallow virtual scan line families extend between two borders of the pattern.

22. The method of claim 16, wherein the at least one steep virtual scan line family comprises a plurality of steep virtual scan line families.

23. The method of claim 22, wherein each of the steep virtual scan line families is defined at a distinct angle relative to the direction of travel of the raster line input and wherein each virtual scan line within a given steep virtual scan line family comprises an overlapping portion.

24. The method of claim 22, wherein at least one steep virtual scan line family repeatedly skips raster lines.

25. The method of claim 24, wherein the at least one steep virtual scan line family captures pixels for storage from every other raster line.

26. A system for reading data from encoded symbols, comprising:
an optical sensor;
a virtual scan line pattern generator for defining a virtual scan line pattern, the virtual scan line pattern comprising at least one shallow virtual scan line family and at least one steep virtual scan line family,
wherein the shallow virtual scan line family is made up of a plurality of shallow virtual scan lines, each defined at a distinct angle relative to the direction of travel of a raster line input from the optical sensor, wherein the virtual scan lines within the shallow virtual scan line family are spaced apart by a fixed number of pixels, and wherein each of the shallow virtual scan lines repeats indefinitely throughout the pattern, and
wherein the steep virtual scan line family is made up of a plurality of steep virtual scan lines, each defined at a distinct angle relative to the direction of travel of the raster line input that is greater than the angle with which the shallow virtual scan lines extend from the raster line input and wherein at least one virtual scan line within the steep virtual scan line family comprises an overlapping portion; and
a storage device for storing raster line data received from the optical sensor according to the pixels from the raster line data that overlap with the virtual scan line pattern.

27. The system of claim 26, wherein the virtual scan line pattern comprises a plurality of shallow virtual scan line families and a plurality of steep virtual scan line families.

28. The system of claim 27, wherein the virtual scan line pattern generator is configured to begin each virtual scan line family on a different raster line.

29. The system of claim 27, wherein at least one steep virtual scan line family is configured to repeatedly skip raster lines.

30. The system of claim 29, wherein the at least one steep virtual scan line family is configured to capture pixels for storage from every other raster line.

31. The system of claim 29, wherein a plurality of steep virtual scan line families are each configured to repeatedly skip raster lines, and wherein each of the plurality of steep virtual scan line families has a different rate with which raster lines are skipped.

32. The system of claim 26, wherein each shallow virtual scan line in the virtual scan line pattern contains a number of pixels equal to the number of pixels on the raster line.

33. The system of claim 26, wherein the virtual scan line pattern generator is configurable to allow for modification of the virtual scan line pattern.

* * * * *